United States Patent [19]

Magel et al.

[11] Patent Number: 5,231,532
[45] Date of Patent: Jul. 27, 1993

[54] SWITCHABLE RESONANT FILTER FOR OPTICAL RADIATION

[75] Inventors: Gregory A. Magel, Dallas; Jon C. Zimmerman, Plano, both of Tex.

[73] Assignee: Texas Instruments Incorporated, Dallas, Tex.

[21] Appl. No.: 831,719

[22] Filed: Feb. 5, 1992

[51] Int. Cl.[5] .................. G02B 26/00; G02B 5/28; G02B 1/10; G02B 27/00
[52] U.S. Cl. .................. 359/295; 359/291; 359/589; 359/586; 359/578
[58] Field of Search .................. 359/290–292, 359/295, 247, 589, 586, 578, 885

[56] References Cited

U.S. PATENT DOCUMENTS

| | | | |
|---|---|---|---|
| 3,001,447 | 9/1961 | Ploke | 359/292 |
| 4,087,810 | 5/1978 | Hung et al. | 359/291 |
| 4,441,791 | 4/1984 | Hornbeck | 359/295 |
| 4,566,935 | 1/1986 | Hornbeck | 359/291 |
| 4,638,309 | 1/1987 | Ott | 359/291 |

OTHER PUBLICATIONS

Rhodes, Charles, PHd Thesis, Published by Ohio State University.

Primary Examiner—Bruce Y. Arnold
Assistant Examiner—Evelyn A. Lester
Attorney, Agent, or Firm—Julie L. Reed; James C. Kesterson; Richard L. Donaldson

[57] ABSTRACT

A structure to be used as a switchable optical filter is disclosed. The structure comprises a substrate transparent to the radiation of interest, which contains or supports an electrode. A spacer layer suspends the membrane over the electrode such that no spacer lies between the electrode and the membrane, yet some spacer remains elsewhere to support the membrane. The membrane has slots in it which are of a specified length in order to resonate at a particular wavelength of radiation. When the electrode is activated, the membrane deflects and its varying proximity to the substrate changes the wavelength of transmission. The method of manufacture is also disclosed.

31 Claims, 3 Drawing Sheets

SWITCHABLE RESONANT FILTER FOR OPTICAL RADIATION

BACKGROUND OF THE INVENTION

1. Field of the invention

This invention relates to optical sensors, more specifically to filters for said sensors.

2. Background of the invention

Optical sensing systems, either in the visible range, or the non-visible, such as infrared, can fall victim to jamming effects. In visible systems, this is normally referred to as veiling. Veiling illuminance is defined as light that is spread across a large portion of the field of view, lessening system effectiveness by lowering scene contrast. Common sources of veiling are sunlight and high-intensity sources. Jamming can also be caused deliberately, such as in defense applications, when an enemy electro-optic source is aimed at the subject system.

A number of sensors currently in use contain fixed stop-band interference filters in slides or wheels for protection from these problems. This approach supplies a limited number of stop-band filter choices and requires operating mechanisms with control circuitry, whether they are mechanical or electromechanical. Activation of these filters takes fractions of seconds, not including operator response time. This fixed-filter approach works well for single-wavelength, non-agile threats. However, fixed-filter techniques are limited against the agile threats expected on the modern battlefield.

Another weakness of the fixed-filter system becomes apparent when considering bandwidth. In the 8 to 12 micron ($10^{-6}$ meter, or $\mu$m) wavelength range, it is not practical to use filters having a bandwidth less than 1 micron. For an infrared system, such as a Forward-Looking InfraRed (FLIR), the integrated transmission of a filter with a single 1 micron stop-band is no better than 50%. Narrower-band filters tend to be more expensive and have insufficient integrated transmission.

Another area of concern with current technology is the difficulty of automation. The system detector can be used to sense when a filter is needed. However, the sensor cannot detect when the filter is no longer needed, since the filter prevents the sensor from seeing the threat. The sensor could be damaged if the filter is switched out and the threat is still present. The long cycle times of mechanical filter assemblies increase the likelihood of damage, if the threat is still present.

SUMMARY OF THE INVENTION

The present invention disclosed herein comprises a switchable resonant filter for optical radiation. One embodiment of the present invention comprises a membrane monolithically manufactured on substrate coated with anti-reflective layers, and containing electrodes. The membrane is formed upon a spacer layer which is laid over the substrate and electrodes, and portions of the spacer layer over the electrodes are removed, via holes etched in the membrane. The holes in the membrane act as antennas for radiation that has the same wavelength as the electrical length of the holes. The electrodes can be addressed to pull the membrane down to the substrate, changing the effective index of refraction surrounding the antennas, and thus change the resonant wavelength of the antennas. The preferred embodiment of the present invention acts as a switch for transmission of radiation at specific wavelengths through the membrane and substrate.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

It is well known that a wire can act as an antenna for certain wavelengths of electromagnetic radiation. The length of the wire as well as the index of refraction, or the dielectric constant, of the surrounding medium, determines the wavelength of the radiation it absorbs. The index of refraction of the medium determines the wavelength of radiation having a given frequency. If the antenna is embedded in a higher index medium, for example, the antenna would have to be shorter to absorb waves of a certain frequency. If made small enough, the antennas will absorb extremely high frequency waves such as infrared (IR).

Consider a fixed wire or antenna illuminated by a variety of wavelengths. If the effective length of the antenna were $l_{eff}$, the antennas would absorb wavelengths, $\lambda$, for which $l_{eff}$ equals integral multiples of one-half $\lambda$. The absorption is caused by losses due to the finite conductivity of the metal.

Instead of a wire, it is possible to make something similar from a sheet of metal with slots the same length as the antenna in the sheet of metal. The behavior of this structure is such that it reflects all wavelengths because of the sheet of metal, except those that are resonant at the length of the slots. Therefore, all wavelengths except for the selected one are stopped. Radiation of the selected wavelength is passed, and the structure transmits it. The result is a filter selectively passing wavelengths to which these slots are tuned. One particular application is in the infrared range, but it could be used for any wavelength of radiation, limited only by the practicality of fabricating slots with the required dimensions.

If the surrounding medium is changed, that will change the wavelength to which the slots are resonant. In order to cause this change, the effective dielectric constant around the slot or slots must be changed. This effectively switches the wavelength that the slots will transmit.

Figure 1A:
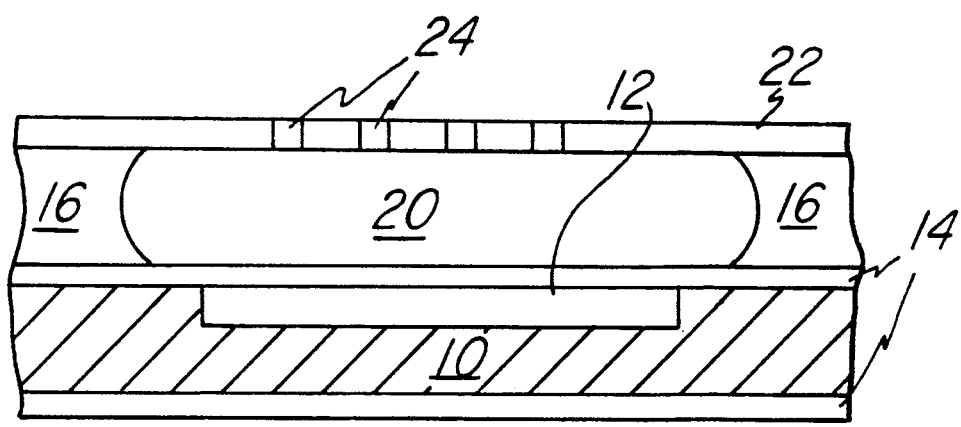
FIG. 1A shows a side view of a switchable filter membrane device with the membrane undeflected.
Figure 1B:
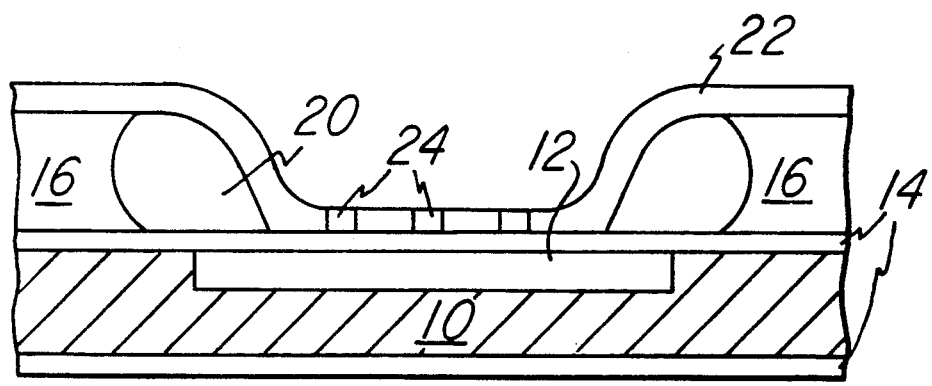
FIG. 1B shows a side view of a switchable filter membrane device when the membrane is deflected.

One embodiment of the present invention is shown as a side view in FIGS. 1A and 1B. A substrate 10, contains an electrode, 12, and can be coated with antireflection coatings 14, or another insulating coating. A spacer material 16 lies on top of the coating, if used, or the electrode. The spacer 16 must be selectively removable, such as with an etch. A thin metal membrane 22 rests upon the spacer. The membrane 22 has slots 24 patterned into it, which also act as etch access holes to remove the spacer. The materials of these various components of this structure will be discussed further as part of the manufacturing process.

FIG. 1B shows the membrane 22 in contact with the substrate or its coating. This is caused by activation of the electrode 12. When a charge is placed upon electrode 12, by addressing circuitry not shown, electrostatic forces build between the electrode and the membrane, attracting the membrane to the electrode. The membrane will eventually come to rest on the substrate. If the anti-reflection coatings are not used, some kind of insulating layer is necessary to prevent shorting between the electrode and the membrane.

The movement of the membrane causes the effective refractive index of the medium surrounding the slots to change. If the slots were initially designed to transmit a wavelength $\lambda$, the initial transmitted wavelength of radiation would be $\lambda/n_{eff}$, where $n_{eff}$ is approximately equal to the refractive index of the surrounding gas or vacuum. When the membrane comes into contact with the substrate the transmitted wavelength changes to $\lambda/n_{eff}$, where $n_{eff}$ is in the range $1.0 < n_{eff} < n_{substrate}$. If the membrane is in contact with a different medium on one side than the other, the effective index is a special kind of average of the indices of the two surrounding media:

$$n_{eff} = \sqrt{\frac{n_1^2 + n_2^2}{2}}$$

where $n_1$ and $n_2$ are the indices of refraction for the medium on either side of the membrane. This change in the peak transmitted wavelength will allow the sensing system to discriminate against jamming, by reducing transmission of the jamming wavelengths.

Figure 2:
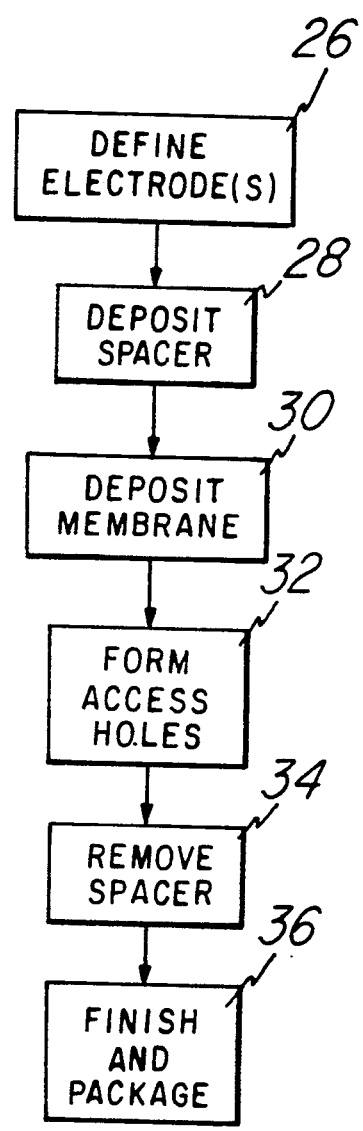
FIG. 2A shows a flow chart of the manufacturing process flow for a switchable resonant filter for optical radiation.

FIG. 2 shows a flow chart for the manufacture of such a filter. The initial step 26 is to define an electrode, or electrodes, in the substrate. The substrate is preferably transparent to the wavelength of interest, such as silicon, or gallium arsenide, which is well-suited for the 8-12 micron wavelength band. The electrode can be formed in many ways. The electrode could be formed by doping, either blanket or patterned. After an implant, a drive-in diffusion may be necessary to activate the dopant and provide sufficiently low resistivity for the electrode. Alternatively, a deposited film electrode, of a transparent conducting material, such as indium tin oxide, or a metal patterned transversely in such a way as to minimally obscure the path of light through the device, is possible. Further, the electrode could also be the substrate, where the substrate is partially conductive. There is an inherent trade-off between the conductivity and transparency of the lower electrode.

Continuing in the process, the next step is step 28, which is the deposition of the spacer layer. If anti-reflection coatings are to be used, the "top" layer, the one between the electrode and the spacer layer, must be applied before the spacer is deposited. For example, they could be deposited by evaporation. The effective index seen by the slots will then be influenced more by the coating index, than by the substrate index. According to the preferred embodiment of the present invention, the spacer comprises a polymer layer, applied by spinning.

The major requirement of the structure is that in its unactuated state, the membrane is far enough away from the substrate such that the substrate does not affect the wavelength that is absorbed or transmitted by the slot. This distance can be less than a wavelength. The closer the membrane is to the substrate, the more critical the distance between them becomes.

The thickness of the spacer must be such that when it is removed, the membrane will be held sufficiently far from the substrate so that the effective refractive index seen by the membrane is significantly different from the index experienced when it approaches or touches the substrate. The effective index of the surrounding medium can be that of air, which is approximately 1.0, if the membrane is far enough away on both sides from any other medium.

In step 30, the membrane is deposited, most likely by sputtering. The membrane is a thin, tensile film of a reflective metal such as gold or aluminum alloy. After the membrane is deposited, it is patterned and etched in step 32 to form the tiny access holes for the etch, as well as the slots. It is possible that the slots will suffice as the etch access holes.

An isotropic selective etch, such as a plasma etch, is used in step 34 to remove the spacer over the electrodes, under the slots, and leave spacer around the edges to support the membrane. Depending on the etch process selected, it may be beneficial to dice the wafer upon which the structure has been constructed before etching. More than one such device may be manufactured upon one wafer. The amount and position of remaining spacer is controlled by the extent of the access holes in the membrane, and the time of the etch. The final result is a thin metal membrane containing a resonant slot pattern supported over an air space where the spacer has been removed. An alternate embodiment could involve multiple electrodes under a single membrane. The spacer would then be left in a grid-like pattern, allowing each electrode to control a defined area of the membrane. The membrane can be electrostatically deflected by application of a voltage between the membrane and the underlying electrode. After the completed structure is finished, it must be packaged and placed in the sensing system, as in step 36. The device will typically be held by the edges, somewhere in the sensing module. The electrical connections are normally best done from the substrate side of the device. Protective packaging may be necessary, depending upon the operating environment of the system.

One problem with using a straight-line slot is that it transmits only radiation whose electric field vector is aligned with the direction of the slot. One solution is to use a pattern of slots oriented in a variety of directions. However, the efficiency of the maximum transmission for a given polarization will be limited by the fraction of properly-oriented slots. To alleviate this problem, it is possible to create a polarization-insensitive device by using a cross or tripole. In the tripole, the slot is designed such that there are three legs, each 120° degrees from the two adjacent legs.

Figure 3:
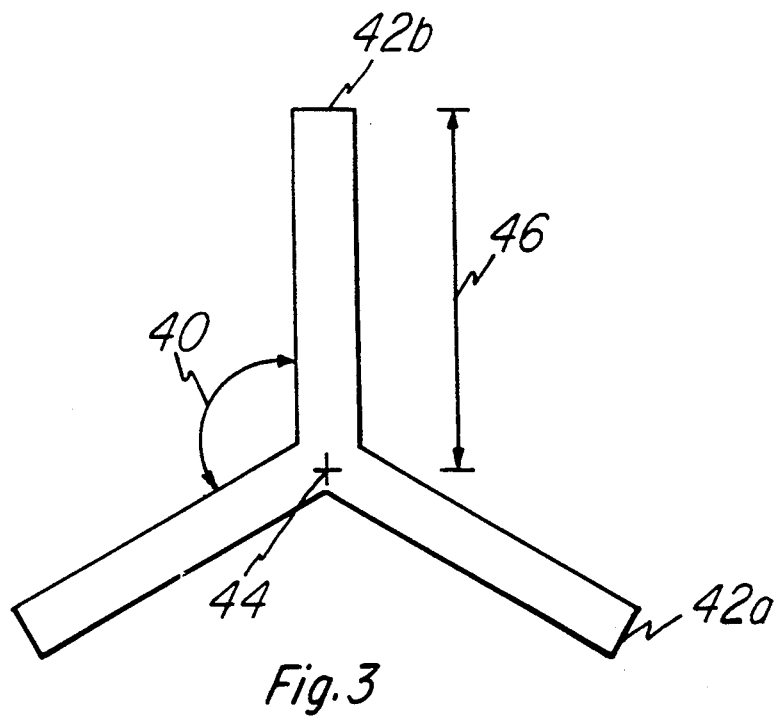
FIG. 3 shows the dimensions of a possible geometry of a resonant slot to be made in a membrane.

The geometry of a tripole slot is shown in FIG. 3. In the case of a tripole, the size is determined by three factors: the freespace optical wavelength of the radiation of interest, $\lambda_O$; the effective refractive index of the surrounding medium, $n_{eff}$; and, a geometrical factor, K. The geometrical factor for a tripole equals $\approx 0.27$. The angle 40 is 120°. The length of a leg is measured from its end, 42A or 42B, to the center of the joint, 44. This distance, $L_T$, is shown by line 46. The length, $L_T$, at which the first resonance of a tripole occurs is given by the formula:

$$L_T = 0.27\left(\frac{\lambda_o}{n_{eff}}\right).$$

When the device is in operation and the membrane contacts the substrate, the center wavelength of the transmitted band is shifted. The width of the transmitted wavelength band is affected, among other things, by the uniformity of the sizes of the slots, as determined by fabrication parameters. The transmission wavelength is longer than before, allowing a switch between two optical bands, or an ON/OFF switch for certain wavelengths. Additionally, it could be used as a radiation chopper, as one of many alternatives.

Figure 4:
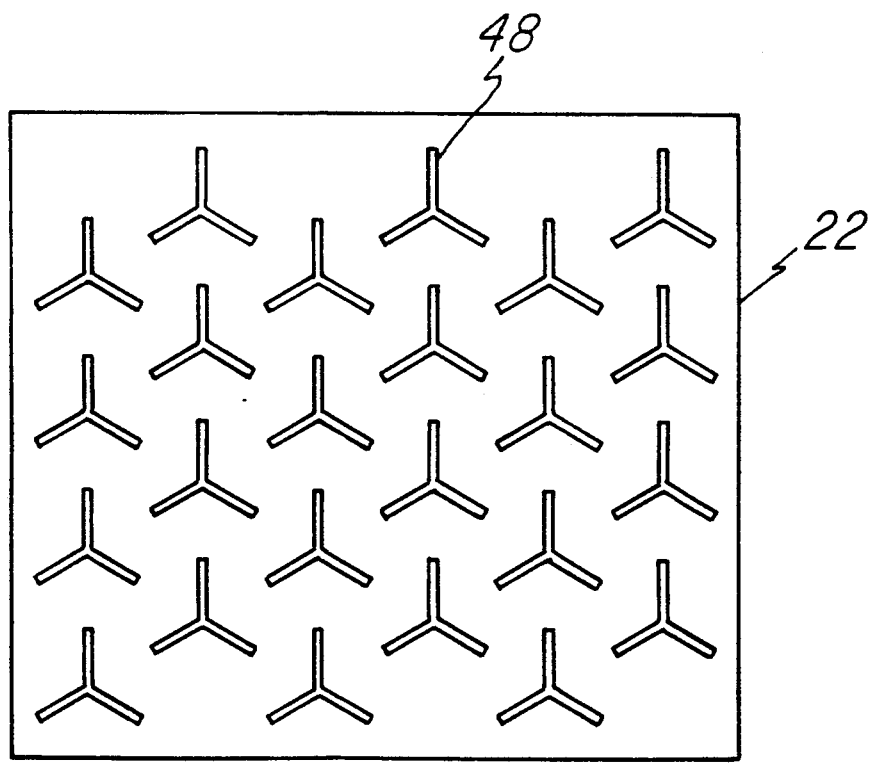
FIG. 4 shows an alternate embodiment wherein the membrane is transparent and includes conducting members.

An alternate embodiment of the present invention could be to use a transparent membrane with a number of conducting members in it. This is shown in FIG. 4. In FIG. 4, the membrane 22 is transparent. The membrane has within it, or on one of its surfaces, conducting members 48. These are shown as tripoles, but could be of any geometry desired, limited only by manufacturing concerns.

Thus, although there has been described to this point particular embodiments of a switchable resonant filter for optical radiation, it is not intended that such specific references be considered as limitations upon the scope of this invention except in-so-far as set forth in the following claims.

What is claimed is:

1. An optical filter comprising:
   a. a substrate substantially transparent to a predetermined wavelength of optical radiation;
   b. at least one electrode formed proximate said substrate;
   c. a spacer formed upon a layer containing said electrode such that said spacer does not cover said electrode;
   d. a membrane formed upon said spacer such that said membrane is suspended over said electrode, supported by said spacer; and
   e. slots formed in said membrane such that said slots are resonant for optical radiation of said predetermined wavelength.

2. The filter of claim 1 wherein said substrate further comprises gallium arsenide.

3. The filter of claim 1 wherein said substrate further comprises silicon.

4. The filter of claim 1 wherein said electrode further comprises a partially conductive substrate.

5. The filter of claim 1 wherein said electrode further comprises a doped region in the substrate.

6. The filter of claim 1 wherein said electrode further comprises a film electrode of a transparent conducting material.

7. The filter of claim 6 wherein said transparent conducting material is indium tin oxide.

8. The filter of claim 1 wherein said electrode further comprises metal patterned transversely so as to minimally obscure the path of light.

9. The filter of claim 1 wherein said membrane is of aluminum alloy.

10. The filter of claim 1 wherein said membrane is of gold.

11. An optical filter comprising:
    a. a substrate substantially transparent to a predetermined wavelength of optical radiation which has two parallel faces;
    b. at least one electrode formed proximate one of said two parallel faces;
    c. anti-reflection coatings formed upon the substrate on at least one of said two parallel faces;
    d. a spacer formed upon a layer containing said electrode such that said spacer does not cover said electrode;
    e. a membrane formed upon said spacer such that said membrane is suspended over said electrode, supported by said spacer;
    f. slots formed in said membrane such that said slots are resonant for optical radiation of a predetermined wavelength.

12. The filter of claim 11 wherein said substrate further comprises gallium arsenide.

13. The filter of claim 11 wherein said substrate further comprises silicon.

14. The filter of claim 11 wherein said electrode further comprises a partially conductive substrate.

15. The filter of claim 11 wherein said electrode further comprises a doped region in the substrate.

16. The filter of claim 11 wherein said electrode further comprises a film electrode of a transparent conducting material.

17. The filter of claim 16 wherein said transparent conducting material is indium tin oxide.

18. The filter of claim 11 wherein said electrode further comprises metal patterned transversely so as to minimally obscure the path of light.

19. The filter of claim 11 wherein said membrane is of aluminum alloy.

20. The filter of claim 11 wherein said membrane is of gold.

21. A method of forming an optical filter comprising:
    a. defining an electrode proximate a substrate;
    b. depositing a layer of spacer material upon said electrode;
    c. forming a membrane over said spacer;
    d. etching plasma access holes in said membrane, wherein said access holes comprise slots which are resonant at a certain wavelength of optical radiation; and
    e. removing said spacer material such that said material is not present over said electrode, but remains elsewhere to support said membrane, such that said membrane is operable to deflect towards said substrate when said electrode is activated.

22. The method of claim 21 wherein said defining step further comprises doping the substrate to form the electrode.

23. The method of claim 21 wherein said defining step further comprises depositing a film electrode.

24. The method of claim 23 wherein said film electrode is a transparent conducting material.

25. The method of claim 24 wherein said transparent conducting material is indium tin oxide.

26. The method of claim 23 wherein said film electrode is metal patterned transversely so as to minimally obscure the path of light.

27. The method of claim 21 wherein said depositing step further comprises depositing anti-reflection coatings upon said substrate.

28. The method of claim 21 wherein said forming step further comprises sputtering said membrane upon said spacer.

29. The method of claim 21 wherein said removing step further comprises a plasma etch.

30. A method for optical filtering comprising:
   a. directing optical radiation toward a membrane including at least one slot which is resonant for a selected predetermined wavelength of said optical radiation;
   b. activating an electrode proximate a substrate having a selected refractive index, said electrode for attracting said membrane; and
   c. moving said membrane including said slot toward said substrate to change the wavelength of said optical radiation at which said slot resonates.

31. An optical filter comprising:
   a. a substrate substantially transparent to a predetermined wavelength of optical radiation;
   b. at least one electrode formed proximate said substrate;
   c. a spacer formed upon a layer containing said electrode such that said spacer does not cover said electrode;
   d. a membrane substantially transparent to said predetermined wavelength formed upon said spacer such that said membrane is suspended over said electrode, supported by said spacer, wherein said membrane includes conducting members.

* * * * *